(12) United States Patent
Guo et al.

(10) Patent No.: US 12,376,162 B2
(45) Date of Patent: Jul. 29, 2025

(54) METHOD FOR MODIFYING BA PROTOCOL PARAMETER AND DEVICE

(71) Applicant: HUAWEI TECHNOLOGIES CO., LTD., Guangdong (CN)

(72) Inventors: Yuchen Guo, Shenzhen (CN); Yunbo Li, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 606 days.

(21) Appl. No.: 17/738,287

(22) Filed: May 6, 2022

(65) Prior Publication Data
US 2022/0272777 A1 Aug. 25, 2022

Related U.S. Application Data

(63) Continuation of application No. PCT/CN2020/126998, filed on Nov. 6, 2020.

(30) Foreign Application Priority Data

Nov. 8, 2019 (CN) .......................... 201911089944.X

(51) Int. Cl.
*H04W 76/11* (2018.01)
*H04L 1/1607* (2023.01)
*H04W 76/15* (2018.01)

(52) U.S. Cl.
CPC ........... *H04W 76/11* (2018.02); *H04L 1/1621* (2013.01); *H04W 76/15* (2018.02)

(58) Field of Classification Search
CPC ..... H04W 76/11; H04W 76/15; H04W 84/12; H04W 28/065; H04L 1/1621; H04L 1/1896; H04L 5/0055
See application file for complete search history.

(56) References Cited

U.S. PATENT DOCUMENTS 9,860,785 B2 * 1/2018 Asterjadhi ............. H04L 1/1628
10,721,026 B2 * 7/2020 Jiang ..................... H04L 1/1621
(Continued)

FOREIGN PATENT DOCUMENTS

CN 106506125 A 3/2017
EP 3444983 A1 2/2019

OTHER PUBLICATIONS

PCT International Search Report and Written Opinion issued in International Application No. PCT/CN2020/126998 on Feb. 4, 2021, 15 pages (with English translation).
(Continued)

*Primary Examiner* — Fahmida S Chowdhury
(74) *Attorney, Agent, or Firm* — Fish & Richardson P.C.

(57) ABSTRACT

This disclosure provides methods for modifying a block acknowledgment (BA) protocol parameter. One example method includes a first device that receives a multi-traffic identifier (multi-TID) BA setup request frame comprising multiple pieces of BA protocol identification information from a second device, where the multi-TID BA setup request frame is used to set up parameter information of multiple BA protocols identified by the multiple pieces of BA protocol identification information. The first device sends a multi-TID BA setup response frame to the second device, where the multi-TID BA setup response frame is used to respond to the multi-TID BA setup request frame.

20 Claims, 7 Drawing Sheets

(56) References Cited

U.S. PATENT DOCUMENTS

| | | | |
|---|---|---|---|
| 10,763,997 B2* | 9/2020 | Jiang | H04L 1/1896 |
| 11,076,385 B2* | 7/2021 | Huang | H04L 5/0055 |
| 11,503,605 B2* | 11/2022 | Huang | H04W 28/20 |
| 11,979,771 B2* | 5/2024 | Ahn | H04W 84/12 |
| 2010/0153807 A1* | 6/2010 | Kakani | H04W 4/06 714/E11.131 |
| 2010/0315999 A1 | 12/2010 | Kakani et al. | |
| 2014/0301208 A1* | 10/2014 | Merlin | H04W 28/0273 370/236 |
| 2016/0087775 A1* | 3/2016 | Hedayat | H04L 5/0055 370/329 |
| 2016/0105836 A1* | 4/2016 | Seok | H04W 72/23 370/331 |
| 2016/0302229 A1* | 10/2016 | Hedayat | H04L 69/324 |
| 2017/0055300 A1* | 2/2017 | Pitchaiah | H04W 76/11 |
| 2017/0070418 A1* | 3/2017 | Li | H04W 76/40 |
| 2017/0310446 A1* | 10/2017 | Asterjadhi | H04L 1/1685 |
| 2018/0026752 A1* | 1/2018 | Andonieh | H04L 1/1614 370/338 |
| 2018/0254857 A1* | 9/2018 | Kim | H04L 1/1614 |
| 2018/0316476 A1* | 11/2018 | Sugaya | H04W 28/04 |
| 2019/0069213 A1* | 2/2019 | Seok | H04L 1/1835 |
| 2019/0109674 A1* | 4/2019 | Hedayat | H04L 5/0007 |
| 2019/0268099 A1* | 8/2019 | Chu | H04B 7/2612 |
| 2019/0288798 A1* | 9/2019 | Jiang | H04L 1/1621 |
| 2020/0037324 A1* | 1/2020 | Chu | H04L 1/0057 |
| 2020/0045634 A1* | 2/2020 | Kneckt | H04W 40/244 |
| 2020/0077417 A1* | 3/2020 | Seok | H04L 1/1841 |

OTHER PUBLICATIONS

Cherian et al., "CIDs: Section 27.4," Mar. 12, 2017, 21 pages.
Office Action in Chinese Appln. No. 201911089944.X, dated Mar. 25, 2023, 6 pages.
Cherian el al., "IEEE P805.11 Wireless LANs CIDs: Section 27.4," IEEE 802.11-17/0319r0, Mar. 12, 2017, 20 pages.
Extended European Search Report in European Appln No. 20884554.5, dated Nov. 11, 2022, 8 pages.

* cited by examiner

Access point device

Station device

| Element ID | Length | Multi-band control | Band identifier | Operating class | Channel number | Basic service set identifier | Beacon interval |

FIG. 4

METHOD FOR MODIFYING BA PROTOCOL PARAMETER AND DEVICE

CROSS-REFERENCE TO RELATED APPLICATIONS

This application is a continuation of International Application No. PCT/CN2020/126998, filed on Nov. 6, 2020, which claims priority to Chinese Patent Application No. 201911089944.X, filed on Nov. 8, 2019. The disclosures of the aforementioned applications are hereby incorporated by reference in their entireties.

TECHNICAL FIELD

This application relates to the communication field, and in particular, to a method for modifying a block acknowledgment (block ACK, BA) protocol parameter and a device.

BACKGROUND

With development of wireless communication technologies, more and more wireless devices (including a multi-link device) support multi-link communication, for example, may perform communication on hands of 2.4 GHz, 5 GHz, and 60 GHz. Even when a number of antennas is limited, the multi-link device may perform switching on different bands, to select an optimal band. This ensures communication quality of the multi-link device.

Generally, before data transmission, a block acknowledgment (BA) protocol needs to be set up between an originator and a recipient, so that the originator sends a data frame in an aggregation manner, and the recipient determines, in a block acknowledgment manner, whether the data frame is correctly received. In other words, a data frame may be transmitted between the originator and the recipient based on the BA protocol, to reduce signaling overheads.

Therefore, a person skilled in the art is studying how to effectively utilize a BA protocol.

SUMMARY

Embodiments of this application provide a method for modifying a BA protocol parameter and a device, so that when a related parameter of a BA protocol is not applicable, the related parameter of the BA protocol may be modified.

According to a first aspect, an embodiment of this application provides a method for modifying a BA protocol parameter. The method includes:

A first device receives a modification request frame including BA protocol identification information from a second device, where the modification request frame is used to request to modify parameter information of a BA protocol identified by the BA protocol identification information.

The first device sends a modification response frame to the second device, where the modification response frame is used to respond to the modification request frame.

In this embodiment of this application, the first device receives the modification request frame including the BA protocol identification information, where the modification request frame is used to request to modify the parameter information of the BA protocol identified by the BA protocol identification information. The first device sends the modification response frame to the second device, where the modification response frame may be used to respond to the modification request frame. The first device may modify, by exchanging the modification request frame and the modification response frame, parameter information of a BA protocol identified by the BA protocol identification information of the first device. Similarly, the second device may modify, by exchanging the modification request frame and the modification response frame, parameter information of a BA protocol identified by the BA protocol identification information of the second device.

In this embodiment of this application, a communication device may modify the parameter information of the BA protocol identified by the BA protocol identification information.

In a possible implementation, the method further includes: The first device modifies the parameter information of the BA protocol identified by the BA protocol identification information.

In a possible implementation, the modification request frame includes a block acknowledgment action (block ACK action) field, and a value of the block acknowledgment action field in the modification request frame is 3.

In a possible implementation, the modification response frame includes a block acknowledgment action field, and a value of the block acknowledgment action field in the modification response frame is 4.

In a possible implementation, the modification request frame includes link information, and the link information includes link information of one or more links.

In a possible implementation, the link information includes an operating class, a channel number, and a band identifier (band ID).

In a possible implementation, the modification request frame further includes first indication information. The first indication information is used to indicate whether the parameter information of the BA protocol identified by the BA protocol identification information is applicable to a transmitting link. The transmitting link is used to carry the modification request frame and/or carry the modification response frame.

In this embodiment of this application, the link information in the modification request frame does not include link information of the transmitting link, and whether the parameter information of the BA protocol identified by the BA protocol identification information is applicable to the transmitting link is indicated by the first indication information. Overheads of the link information are greater than overheads of the first indication information. According to the method in this embodiment of this application, overheads occupied by the modification request frame can be reduced.

In a possible implementation, the first indication information is a fragment number subfield whose value is a special value, and the fragment number subfield is located in a block acknowledgment starting sequence control (block ACK starting sequence control) field.

According to a second aspect, an embodiment of this application provides a method for modifying a BA protocol parameter. The method includes:

A second device sends a modification request frame including BA protocol identification information to a first device, where the modification request frame is used to request to modify parameter information of a BA protocol identified by the BA protocol identification information.

The second device receives a modification response frame from the first device, where the modification response frame is used to respond to the modification request frame.

In a possible implementation, the method further includes: The second device modifies, based on the modification response frame, the parameter information of the BA protocol identified by the BA protocol identification information.

In a possible implementation, the modification request frame includes a block acknowledgment action (block ACK action) field, and a value of the block acknowledgment action field in the modification request frame is 3.

In a possible implementation, the modification response frame includes a block acknowledgment action field, and a value of the block acknowledgment action field in the modification response frame is 4.

In a possible implementation, the modification request frame includes link information, and the link information includes link information of one or more links.

In a possible implementation, the link information includes an operating class, a channel number, and a band identifier (band ID).

In a possible implementation, the modification request frame further includes first indication information. The first indication information is used to indicate whether the parameter information of the BA protocol identified by the BA protocol identification information is applicable to a transmitting link. The transmitting link is used to carry the modification request frame and/or carry the modification response frame.

In a possible implementation, the first indication information is a fragment number field whose value is a special value. The fragment number field is a fragment number field whose value is the special value in a block acknowledgment starting sequence control (block ACK starting sequence control) field.

According to a third aspect, an embodiment of this application provides a method for modifying a BA protocol parameter. The method includes: A first device receives a multi-traffic identifier (multi-traffic ID, multi-TID) BA setup request frame including multiple pieces of BA protocol identification information from a second device, where the multi-TID BA setup request frame is used to request to set up parameter information of multiple BA protocols identified by the multiple pieces of BA protocol identification information. The first device sends a multi-TID BA setup response frame to the second device, where the multi-TID BA setup response frame is used to respond to the multi-TID BA setup request frame.

In this embodiment of this application, the first device may set up, by exchanging the multi-TID BA setup request frame and the multi-TID BA setup response frame, parameter information of multiple BA protocols identified by the multiple pieces of BA protocol identification information of the first device. Similarly, the second device may set up, by exchanging the multi-TID BA setup request frame and the multi-TID BA setup response frame, parameter information of multiple BA protocols identified by the multiple pieces of BA protocol identification information of the second device.

In this embodiment of this application, a communication device may set up parameter information of the multiple BA protocols through one frame exchange. This improves information exchange efficiency and efficiency of setting up the parameter information of the multiple BA protocols.

In a possible implementation, the method further includes: The first device sets up the parameter information of the multiple BA protocols identified by the multiple pieces of BA protocol identification information.

In a possible implementation, the multi-TID BA setup request frame includes multiple pieces of request information, and each of the multiple pieces of request information corresponds to one BA protocol. Each piece of request information includes one or more of the following information: a block acknowledgment parameter set (block ACK parameter set) field, a block acknowledgment timeout value (block ACK timeout value) field, and a block acknowledgment starting sequence control field.

In a possible implementation, the multi-TID BA setup request frame includes link information, the link information includes link information of one or more links, and link information of the multiple BA protocols identified by the multiple pieces of BA protocol identification information is the same.

In a possible implementation, the multi-TID BA setup request frame further includes first indication information. The first indication information is used to indicate whether the parameter information of the multiple BA protocols identified by the multiple pieces of BA protocol identification information is applicable to a transmitting link. The transmitting link is used to carry the multi-TID BA setup request frame and/or carry the multi-TID BA setup response frame.

In a possible implementation, the first indication information is a fragment number subfield whose value is a special value, and the fragment number subfield is located in the block acknowledgment starting sequence control (block ACK starting sequence control) field.

In a possible implementation, the method further includes: The first device receives a multi-TID deletion frame including the BA protocol identification information from the second device, where the multi-TID deletion frame is used to request to delete the parameter information of the BA protocol identified by the BA protocol identification information. The first device deletes, based on the multi-TID deletion frame, the parameter information of the BA protocol identified by the BA protocol identification information.

According to a fourth aspect, an embodiment of this application provides a method for setting up multiple BA protocol parameters. The method includes: A second device sends a multi-traffic identifier (multi-traffic ID, multi-TID) BA setup request frame including multiple pieces of BA protocol identification information to a first device, where the multi-TID BA setup request frame is used to request to set up parameter information of multiple BA protocols identified by the multiple pieces of BA protocol identification information. The second device receives a multi-TID BA setup response frame from the first device, where the multi-TID BA setup response frame is used to respond to the multi-TID BA setup request frame.

In a possible implementation, the method further includes: The second device sets up, based on the multi-TID BA setup response frame, the parameter information of the multiple BA protocols identified by the multiple pieces of BA protocol identification information.

In a possible implementation, the multi-TID BA setup request frame includes multiple pieces of request information, and each of the multiple pieces of request information corresponds to one BA protocol. Each piece of request information includes one or more of the following information: a block acknowledgment parameter set (block ACK parameter set) field, a block acknowledgment timeout value (block ACK timeout value) field, and a block acknowledgment starting sequence control (block ACK starting sequence control) field.

In a possible implementation, the multi-TID BA setup request frame includes link information, the link information includes link information of one or more links, and link information of the multiple BA protocols identified by the multiple pieces of BA protocol identification information is the same.

In a possible implementation, the multi-TID BA setup request frame further includes first indication information. The first indication information is used to indicate whether the parameter information of the multiple BA protocols identified by the multiple pieces of BA protocol identification information is applicable to a transmitting link. The transmitting link is used to carry the multi-TID BA setup request frame and/or carry the multi-TID BA setup response frame.

In a possible implementation, the first indication information is a fragment number subfield whose value is a special value, and the fragment number subfield is located in the block acknowledgment starting sequence control (block ACK starting sequence control) field.

In a possible implementation, the method further includes: The second device sends a multi-TID deletion frame including the BA protocol identification information to the first device, where the multi-TID deletion frame is used to request to delete the parameter information of the BA protocol identified by the BA protocol identification information. The second device deletes the parameter information of the BA protocol identified by the BA protocol identification information.

According to a fifth aspect, an embodiment of this application provides a method for modifying a BA protocol parameter. The method includes:

A first device receives a first request frame including BA protocol identification information from a second device, where the first request frame is used to request to set up or request to modify parameter information of a BA protocol identified by the BA protocol identification information. The first request frame further includes first indication information. The first indication information is used to indicate whether the parameter information of the BA protocol identified by the BA protocol identification information is applicable to a transmitting link. The transmitting link is used to carry the first request frame and/or carry a response frame of the first request frame.

The first device sends a first response frame to the second device, where the first response frame is used to respond to the first request frame.

In this embodiment of this application, link information in the first request frame does not include link information of the transmitting link, and whether the parameter information of the BA protocol identified by the BA protocol identification information is applicable to the transmitting link is indicated by the first indication information. Overheads of the link information are greater than overheads of the first indication information. According to the method in this embodiment of this application, overheads occupied by the first request frame can be reduced.

In a possible implementation, the first indication information is a fragment number subfield whose value is a special value, and the fragment number subfield is located in a block acknowledgment starting sequence control (block ACK starting sequence control) field.

In a possible implementation, the first request frame includes the link information, and the link information includes link information of one or more links.

In a possible implementation, the link information includes an operating class, a channel number, and a band identifier (band ID).

According to a sixth aspect, an embodiment of this application provides a method for modifying a BA protocol parameter. The method includes:

A second device sends a first request frame including BA protocol identification information to a first device, where the first request frame is used to request to set up or request to modify parameter information of a BA protocol identified by the BA protocol identification information. The first request frame further includes first indication information. The first indication information is used to indicate whether the parameter information of the BA protocol identified by the BA protocol identification information is applicable to a transmitting link. The transmitting link is used to carry the first request frame and/or carry a response frame of the first request frame.

The second device receives a first response frame from the first device, where the first response frame is used to respond to the first request frame.

In a possible implementation, the first indication information is a fragment number subfield whose value is a special value, and the fragment number subfield is located in a block acknowledgment starting sequence control (block ACK starting sequence control) field.

In a possible implementation, the first request frame includes the link information, and the link information includes link information of one or more links.

In a possible implementation, the link information includes an operating class, a channel number, and a band identifier (band ID).

According to a seventh aspect, an embodiment of this application provides a first device. The first device includes a unit configured to implement the method according to the first aspect and the possible implementations of the first aspect.

According to an eighth aspect, an embodiment of this application provides a first device. The first device includes a unit configured to implement the method according to the third aspect and the possible implementations of the third aspect.

According to a ninth aspect, an embodiment of this application provides a first device. The first device includes a unit configured to implement the method according to the fifth aspect and the possible implementations of the fifth aspect.

According to a tenth aspect, an embodiment of this application provides a second device. The second device includes a unit configured to implement the method according to the second aspect and the possible implementations of the second aspect.

According to an eleventh aspect, an embodiment of this application provides a second device. The second device includes a unit configured to implement the method according to the fourth aspect and the possible implementations of the fourth aspect.

According to a twelfth aspect, an embodiment of this application provides a second device. The second device includes a unit configured to implement the method according to the sixth aspect and the possible implementations of the sixth aspect.

According to a thirteenth aspect, an embodiment of this application provides a first device. The first device includes a processor and a memory, the memory is configured to store computer-executable instructions, and the processor is configured to execute the computer-executable instructions stored in the memory, so that the first device performs the method according to the first aspect and the possible implementations of the first aspect.

According to a fourteenth aspect, an embodiment of this application provides a first device. The first device includes a processor and a memory, the memory is configured to store computer-executable instructions, and the processor is configured to execute the computer-executable instructions stored in the memory, so that the first device performs the method according to the third aspect and the possible implementations of the third aspect.

According to a fifteenth aspect, an embodiment of this application provides a first device. The first device includes a processor and a memory, the memory is configured to store computer-executable instructions, and the processor is configured to execute the computer-executable instructions stored in the memory, so that the first device performs the method according to the fifth aspect and the possible implementations of the fifth aspect.

According to a sixteenth aspect, an embodiment of this application provides a second device. The second device includes a processor and a memory, the memory is configured to store computer-executable instructions, and the processor is configured to execute the computer-executable instructions stored in the memory, so that the second device performs the method according to the second aspect and the possible implementations of the second aspect.

According to a seventeenth aspect, an embodiment of this application provides a second device. The second device includes a processor and a memory, the memory is configured to store computer-executable instructions, and the processor is configured to execute the computer-executable instructions stored in the memory, so that the second device performs the method according to the fourth aspect and the possible implementations of the fourth aspect.

According to an eighteenth aspect, an embodiment of this application provides a second device. The second device includes a processor and a memory, the memory is configured to store computer-executable instructions, and the processor is configured to execute the computer-executable instructions stored in the memory, so that the second device performs the method according to the sixth aspect and the possible implementations of the sixth aspect.

According to a nineteenth aspect, an embodiment of this application provides a computer-readable storage medium, configured to store a computer program used to perform the first aspect and the possible implementations of the first aspect.

According to a twentieth aspect, an embodiment of this application provides a computer-readable storage medium, configured to store a computer program used to perform the third aspect and the possible implementations of the third aspect.

According to a twenty-first aspect, an embodiment of this application provides a computer-readable storage medium, configured to store a computer program used to perform the fifth aspect and the possible implementations of the fifth aspect.

According to a twenty-second aspect, an embodiment of this application provides a computer-readable storage medium, configured to store a computer program used to perform the second aspect and the possible implementations of the second aspect.

According to a twenty-third aspect, an embodiment of this application provides a computer-readable storage medium, configured to store a computer program used to perform the fourth aspect and the possible implementations of the fourth aspect.

According to a twenty-fourth aspect, an embodiment of this application provides a computer-readable storage medium, configured to store a computer program used to perform the sixth aspect and the possible implementations of the sixth aspect.

According to a twenty-fifth aspect, an embodiment of this application provides a computer program, configured to perform the first aspect and the possible implementations of the first aspect.

According to a twenty-sixth aspect, an embodiment of this application provides a computer program, configured to perform the third aspect and the possible implementations of the third aspect.

According to a twenty-seventh aspect, an embodiment of this application provides a computer program, configured to perform the fifth aspect and the possible implementations of the fifth aspect.

According to a twenty-eighth aspect, an embodiment of this application provides a computer program, configured to perform the second aspect and the possible implementations of the second aspect.

According to a twenty-ninth aspect, an embodiment of this application provides a computer program, configured to perform the fourth aspect and the possible implementations of the fourth aspect.

According to a thirtieth aspect, an embodiment of this application provides a computer program, configured to perform the sixth aspect and the possible implementations of the sixth aspect.

BRIEF DESCRIPTION OF DRAWINGS

FIG. 4 is a schematic diagram of a structure of a multi-band field according to an embodiment of this application;

DESCRIPTION OF EMBODIMENTS

In the specification, claims, and accompanying drawings of this application, the terms "first", "second", "third", "fourth", and the like are intended to distinguish between different objects but do not indicate a particular order. In addition, the terms "including", "having", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

Mentioning an "embodiment" in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that embodiments described in this specification may be combined with another embodiment.

In this application, "at least one (item)" means one or more, "multiple" means two or more, and "at least two (items)" means two or more than three (including three). The term "and/or" is used to describe an association relationship for describing associated objects and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of multiple items (pieces). For example, at least one (piece) of a, b, or c may represent: a, b, c, "a and b", "a and c", "b and c", or "a, b, and c", where a, b, and c may be singular or plural.

First, a network architecture in the embodiments of this application is described.

Figure 1:
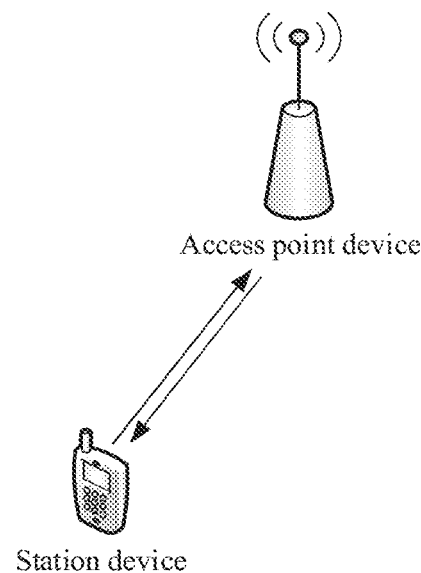
FIG. 1 is a schematic diagram of an architecture of a communication system according to an embodiment of this application.

FIG. 1 is a schematic diagram of an architecture of a communication system according to an embodiment of this application. The communication system includes an access point device and a station device. The access point device may include one or more access points (AP), and the station device may include one or more stations (STA). The access point device may also be understood as an access point entity, and the station device may also be understood as a station entity.

The AP may be an access point used by a terminal device such as a mobile phone to access a wired (or wireless) network, and is mainly deployed at home, in a building, and in a park. A typical coverage radius is tens of meters to a hundred meters. Certainly, the access point may also be deployed outdoors. The AP is equivalent to a bridge that connects the wired network and a wireless network. The AP is mainly used to connect wireless network clients to each other, and then connect the wireless network to the Ethernet. Specifically, the AP may be a terminal device (such as a mobile phone) or a network device (such as a router) with a wireless fidelity (Wi-Fi) chip. The AP may be a device that supports the 802.11be standard. Alternatively, the AP may be a device that supports multiple wireless local area network (WLAN) standards such as 802.11ax, 802.11ac, 802.11n, 802.11g, 802.11b, and 802.11a. The STA may be a wireless communication chip, a wireless sensor, or a wireless communication terminal. For example, the STA may be a mobile phone that supports a Wi-Fi communication function, a tablet computer that supports a Wi-Fi communication function, a set top box that supports a Wi-Fi communication function, a smart television that supports a communication function, a smart wearable device that supports a Wi-Fi communication function, a vehicle-mounted communication device that supports a Wi-Fi communication function, or a computer that supports a Wi-Fi communication function. Optionally, the STA may support the 802.11be standard. Alternatively, the STA may support multiple wireless local area network (WLAN) standards such as 802.11ax, 802.11ac, 802.11n, 802.11g, 802.11b, and 802.11a.

In this embodiment of this application, a first device may be an access point device or a station device. A second device may also be an access point device or a station device. For example, the first device may be an access point device, and the second device may also be an access point device. In another example, the first device is a station device, and the second device may also be a station device. In another example, the first device is an access point device, and the second device is a station device. In another example, the first device is a station device, and the second device is an access point device.

Figure 2:
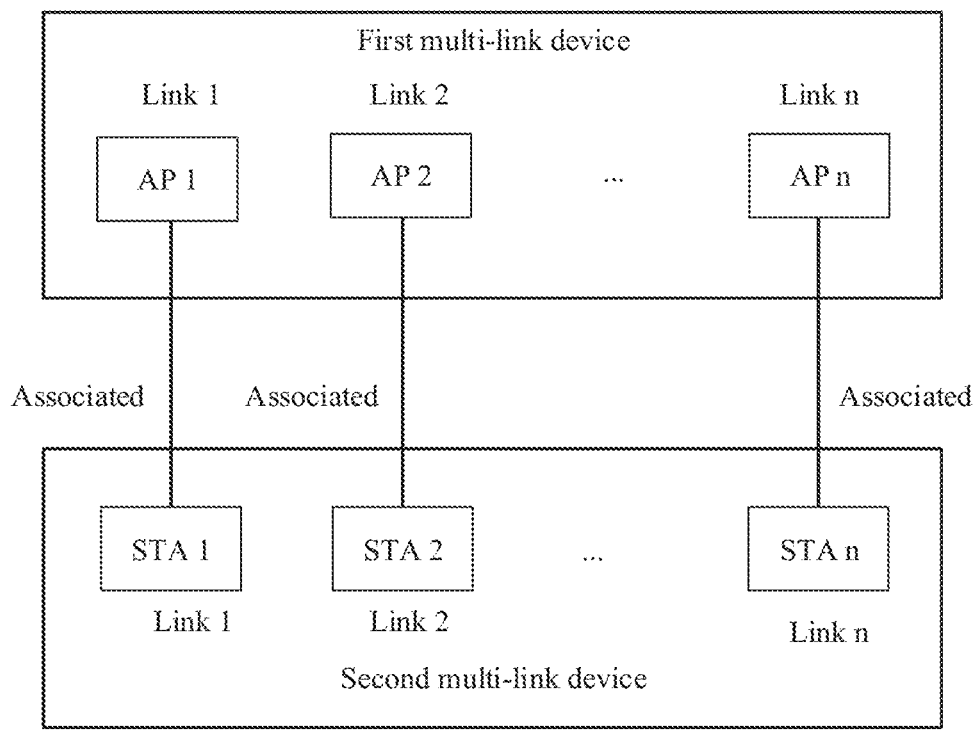
FIG. 2 is a schematic diagram of setting up an association relationship between multi-link devices according to an embodiment of this application.

For example, FIG. 2 is a schematic diagram of setting up an association relationship between multi-link devices according to an embodiment of this application. In FIG. 2, a first multi-link device is an access point device, the first multi-link device includes multiple APs, and the multiple APs work on different bands. A second multi-link device is a station device, the second multi-link device includes multiple STAs, and the multiple STAs work on different bands. In this case, the multi-link device may also be referred to as a multi-band device. It should be understood that the first multi-link device may be an access point device, and the second multi-link device communicating with the first multi-link device may also be an access point device. Similarly, the first multi-link device may be a station device, and the second multi-link device communicating with the first multi-link device may also be a station device. The method in this embodiment of this application is applicable to multiple communication scenarios, which are described above. Details are not described herein again. If the first multi-link device needs to communicate with the second multi-link device, each station in the first multi-link device needs to be associated with a corresponding station in the second multi-link device. As shown in FIG. 2, an AP 1 in the first multi-link device and a STA 1 in the second multi-link device are associated, and work on a link 1. An AP 2 in the first multi-link device and an STA 2 in the second multi-link device are associated, and work on a link 2. An AP n in the first multi-link device and an STA n in the second multi-link device are associated, and work on a link n. In this way, each AP in the first multi-link device may set up a connection to a corresponding STA in the second multi-link device on a respective link, to implement multi-link communication between the two multi-link devices.

For example, as shown in FIG. 2, the first multi-link device and the second multi-link device set up a BA protocol over the link 1 between the AP 1 and the STA 1, where the BA protocol may include link information of one or more links. For example, if a BA protocol setup frame for setting up the BA protocol carried on the link 1 includes link information of the link 2 and a link 3, a BA protocol of the link 2 and a BA protocol of the link 3 are set up by using the BA protocol setup frame.

It should be understood that the first device or the second device in the embodiments of this application may be the first multi-link device or the second multi-link device in FIG. 2.

When modifying parameter information of a BA protocol, the first device or the second device needs to first delete the BA protocol that has been set up, and then set up a new BA protocol. Specifically, the first device sends a BA deletion frame to the second device, to delete a BA protocol that has been set up, and then set up a new BA protocol by using one setup request frame and one response frame. Specifically, the first device sends an add block acknowledgment (add BA, ADDBA) request frame to the second device, and the second device returns an ADDBA response frame to the first device.

The foregoing method for modifying parameter information of a BA protocol is complex. Therefore, according to a method for modifying a BA protocol parameter provided in this embodiment of this application, the parameter information of the BA protocol can be quickly and easily modified.

Figure 3:
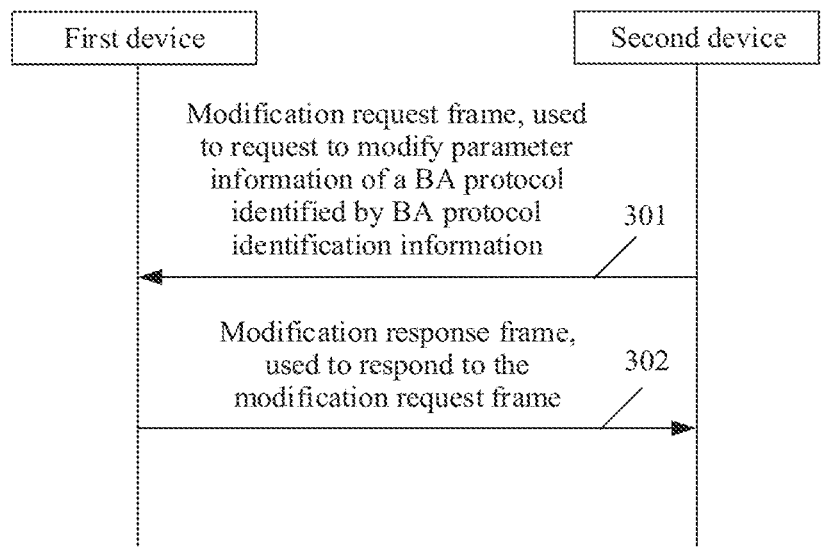
FIG. 3 is a schematic flowchart of a method for modifying a BA protocol parameter according to an embodiment of this application.

FIG. 3 is a schematic flowchart of a method for modifying a BA protocol parameter according to an embodiment of this application. As shown in FIG. 3, the method includes the following steps.

301: A second device sends a modification request frame including BA protocol identification information to a first device, where the modification request frame is used to request to modify parameter information of a BA protocol identified by the BA protocol identification information.

Correspondingly, the first device receives the modification request frame including the BA protocol identification information.

There may be multiple service flows identified by traffic IDs (TID) between the first device and the second device, and different TIDs correspond to different BA protocols. A transmitter address of the modification request frame and a TID may be used as identification information of the BA protocol. In other words, the identification information of the BA protocol may be a combination of (the transmitter address of the modification request frame, the TID). The transmitter address of the modification request frame may be a MAC address of a transmit end (the second device), and the TID may be included in a block acknowledgment parameter set field in the modification request frame.

The modification request frame may be a change BA request (CHGBA request) frame. Correspondingly, a modification response frame may be a change BA response (CHGBA response) frame.

It should be understood that the modification request frame may be used to request to modify the parameter information of the BA protocol identified by the BA protocol identification information. Specific parameter information to be modified is not limited in this embodiment of this application.

302: The second device receives a modification response frame from the first device, where the modification response frame is used to respond to the modification request frame.

Correspondingly, the first device sends the modification response frame.

In this embodiment of this application, the modification request frame may be an action frame, and a frame structure of a frame body part of the modification request frame may be shown in Table 1.

TABLE 1

Order Information

1 Category
2 Block acknowledgment action (block ACK action)
3 Dialog token

TABLE 1-continued

Order Information

4 Block acknowledgment parameter set (block ACK parameter set)
5 Block acknowledgment timeout value (block ACK timeout value)
6 Block acknowledgment starting sequence control (block ACK starting sequence control)
7 Groupcast with retries group address element (GCR group address element) (optional)
8 Number of links
9 Multi-band (multi-band (optional, one or more))
10 Traffic classification (TCLAS) (optional)
11 ADDBA extension (optional)

The modification response frame is an action frame, and a frame structure of a frame body part of the modification response frame may be shown in Table 2.

TABLE 2

Order Information

1 Category
2 Block acknowledgment action (block ACK action)
3 Dialog token
4 Status code
5 Block acknowledgment parameter set (block ACK parameter set)
6 Block acknowledgment timeout value (block ACK timeout value)
7 Block acknowledgment starting sequence control (block ACK starting sequence control)
8 Groupcast with retries group address element (GCR group address element) (optional)
9 Number of links
10 Multi-band (optional, one or more))
11 TCLAS (optional)
12 ADDBA extension (optional)

As shown in Table 1, the modification request frame includes a block acknowledgment action field, and a value of the block acknowledgment action field is 3. In other words, the value of the block acknowledgment action field in the modification request frame is 3, indicating that the modification request frame is used to request to modify the parameter information of the BA protocol identified by the BA protocol identification information. As shown in Table 2, the modification response frame includes a block acknowledgment action field, and a value of the block acknowledgment action field is 4. In other words, the value of the block acknowledgment action field in the modification response frame is 4, indicating that the modification response frame is used to respond to the modification request frame. Specifically, block acknowledgment action field values are shown in Table 3. A value of a block acknowledgment action field is 3, indicating that a function of the modification request frame in which the block acknowledgment action field is located is used to request to modify the parameter information of the BA protocol identified by the BA protocol identification information. A value of a block acknowledgment action field is 4, indicating that a function of the modification response frame in which the block acknowledgment action field is located is used to correspond to the modification request frame.

Optionally, the value of the block acknowledgment action field in the modification request frame may be any one of 5 to 127, 131, and 135 to 255, and the value of the block acknowledgment action field in the modification response frame may be any one of 5 to 127, 131, and 135 to 255. In addition, the value of the block acknowledgment action field in the modification request frame is different from the value of the block acknowledgment action field in the modification response frame.

TABLE 3

| Block acknowledgment action field value (block Ack action field values) | Meaning |
| --- | --- |
| 0 | ADDBA request |
| 1 | ADDBA response |
| 2 | DELBA |
| 3 | CHGBA request |
| 4 | CHGBA response |
| 5 to 127 | Reserved |
| 128 (11ah) | NDP ADDBA request |
| 129 (11ah) | NDP ADDBA response |
| 130 (11ah) | NDP DELBA |
| 131 (11ah) | Reserved |
| 132 (11ah) | BAT ADDBA request |
| 133 (11ah) | BAT ADDBA response |
| 134 (11ah) | BAT DELBA |
| 135 to 255 (11ah) | Reserved |

In some embodiments of this application, the modification request frame includes link information, and the link information includes link information of one or more links. The link information is carried in multi-band fields in Table 1 and Table 2. Optionally, the link information of the one or more links may be link information of the BA protocol identified by the BA protocol identification information. Optionally, the one or more links may be links that need to be added to the link information of the BA protocol identified by the BA protocol identification information. For example, links of a BA protocol that has been set up between the first device and the second device include a link 1 and a link 2. If the second device needs to add a link, for example, a link 3, to the links of the BA protocol, the modification request frame may include link information of the link 1, link information of the link 2, and link information of the link 3. Alternatively, the modification request frame may include link information of the link 3.

Optionally, the multi-band fields may each include one or more of the following information: an operating class, a channel number, or a band identifier (band ID). For example, FIG. 4 is a schematic diagram of some formats of the multi-band fields in Table 1 and Table 2. As shown in FIG. 4, the multi-band fields each include a band identifier (band ID) subfield, a channel number subfield, an operating class subfield, an element identifier (element ID) subfield, a length subfield, a multi-band control subfield, a beacon interval subfield, and the like.

Optionally, the link information may be carried in a multi-link field. The multi-link field may include one or more of the following information: an operating class field, a channel number field, or a band identifier (band ID) field. The multi-link field may be located in a field corresponding to the multi-band field in Table 1 and Table 2.

It should be understood that, in addition to the multi-band fields and the block acknowledgment action fields, the modification request frame and the modification response frame may further include other fields shown in Table 1 and Table 2. For example, subfields included in block acknowledgment parameter set fields in Table 1 and Table 2 may be shown in FIG. 5. The block acknowledgment parameter set fields may each include 16 bits. A first bit B0 is a support aggregate media access control (MAC) protocol service unit (aggregate MAC protocol service unit, A-MSDU) or not subfield. A second bit B1 is a BA rule (block ACK policy) subfield, for example, including a block acknowledgment frame that is delayed or not. A third bit B2 to a sixth bit B5 are TID subfields. The remaining bits B6 to B15 are buffer size subfields. For example, further, the modification request frame and the modification response frame each include a block acknowledgment timeout value field, a block acknowledgment starting sequence control field, and a number of links field used for multi-link aggregation communication. For example, a dialog token field in the modification request frame may be used to identify the request frame, and a dialog token in the modification response frame may be used to identify a request frame to which the response frame responds. For example, a status code field in the modification response frame may be used to indicate whether parameter information of a BA protocol that is requested to be modify by using the modification request frame is successfully set up.

For example, the buffer size subfield indicates a maximum number of data frames that can be buffered (or stored) by a device to meet in-order delivery. The support A-MSDU or not subfield is used to indicate whether A-MSDU aggregation can be performed on a data frame sent by the device. The block acknowledgment timeout value field indicates that if no data frame, block acknowledgment request (BAR) frame, or block acknowledgment (BA) frame is transmitted between devices within a timeout period, the parameter information of the BA protocol is deleted. The number of links field indicates a number of links that can be used when a data frame corresponding to the BA protocol is transmitted between the devices. The block acknowledgment starting sequence control field indicates a sequence number of a first data frame sent after the parameter information of the BA protocol is set up between the devices, to be specific, indicates a frame from which data frame transmission can start based on the parameter information of the BA protocol.

Optionally, the method shown in FIG. 3 further includes:

(1) The first device modifies the parameter information of the BA protocol identified by the BA protocol identification information.

In this embodiment of this application, the first device may modify the block acknowledgment parameter set field, the block acknowledgment timeout value field, and the like. For example, the first device may adjust a receive window size, where the receive window size may be determined based on a buffer size subfield, and the buffer size subfield is located in the block acknowledgment parameter set field. Alternatively, the first device may further adjust whether to use a BAR or BA that is delayed or not (which is located in the block acknowledgment parameter set field). Alternatively, the first device may further adjust whether to perform A-MSDU aggregation (which is located in the block acknowledgment parameter set field). Alternatively, the first device may further adjust a BA protocol timeout value (which is located in the block acknowledgment timeout value field) or the like.

(2) The second device modifies, based on the modification response frame, the parameter information of the BA protocol identified by the BA protocol identification information.

In this embodiment of this application, the second device may modify the block acknowledgment parameter set field, the block acknowledgment timeout value field, and the like. For example, the second device may adjust a send window size, where the send window size may be determined based on a buffer size subfield, and the buffer size subfield is located in the block acknowledgment parameter set field. Alternatively, the second device may further adjust whether to use a BAR or BA that is delayed or not (which is located in the block acknowledgment parameter set field). Alternatively, the second device may further adjust whether to perform A-MSDU aggregation (which is located in the block acknowledgment parameter set field). Alternatively, the second device may further adjust a BA protocol timeout value (which is located in the block acknowledgment timeout value field).

It may be understood that whether the parameter information of the BA protocol included in the modification request frame is the same as parameter information of the BA protocol included in the modification response frame is not limited in this embodiment of this application. For example, a buffer indicated by a buffer size subfield in the block acknowledgment parameter set field in the modification request frame is large, but the first device does not have sufficient storage space. Therefore, the first device may modify a buffer size of the BA protocol based on the storage space of the first device. In this case, the buffer size indicated by the buffer size subfield in the modification request frame is different from a buffer size indicated by a buffer size subfield in the modification response frame.

Optionally, the method shown in FIG. 3 may further include:

(3) The second device sends a deletion frame to the first device, where the deletion frame is used to request to delete link information of one or more links. The first device receives the deletion frame.

(4) The first device deletes the link information of the one or more links based on the deletion frame.

(5) The second device deletes the link information of the one or more links.

In this embodiment, a value of a block acknowledgment action field in the deletion frame may be shown in Table 3, For specific descriptions of the link information, refer to descriptions in the foregoing embodiments. Details are not described herein again.

In this embodiment of this application, the first device receives the modification request frame including the BA protocol identification information, where the modification request frame may be used to request to modify the parameter information of the BA protocol identified by the BA protocol identification information. The first device sends the modification response frame to the second device, where the modification response frame may be used to respond to the modification request frame. Therefore, the first device and the second device complete modification of the parameter information of the BA protocol identified by the BA protocol identification information. In this way, a parameter of the BA protocol identified by the BA protocol identification information is more applicable to data frame transmission between the second device and the first device. This improves data transmission efficiency.

Figures 5, 6:
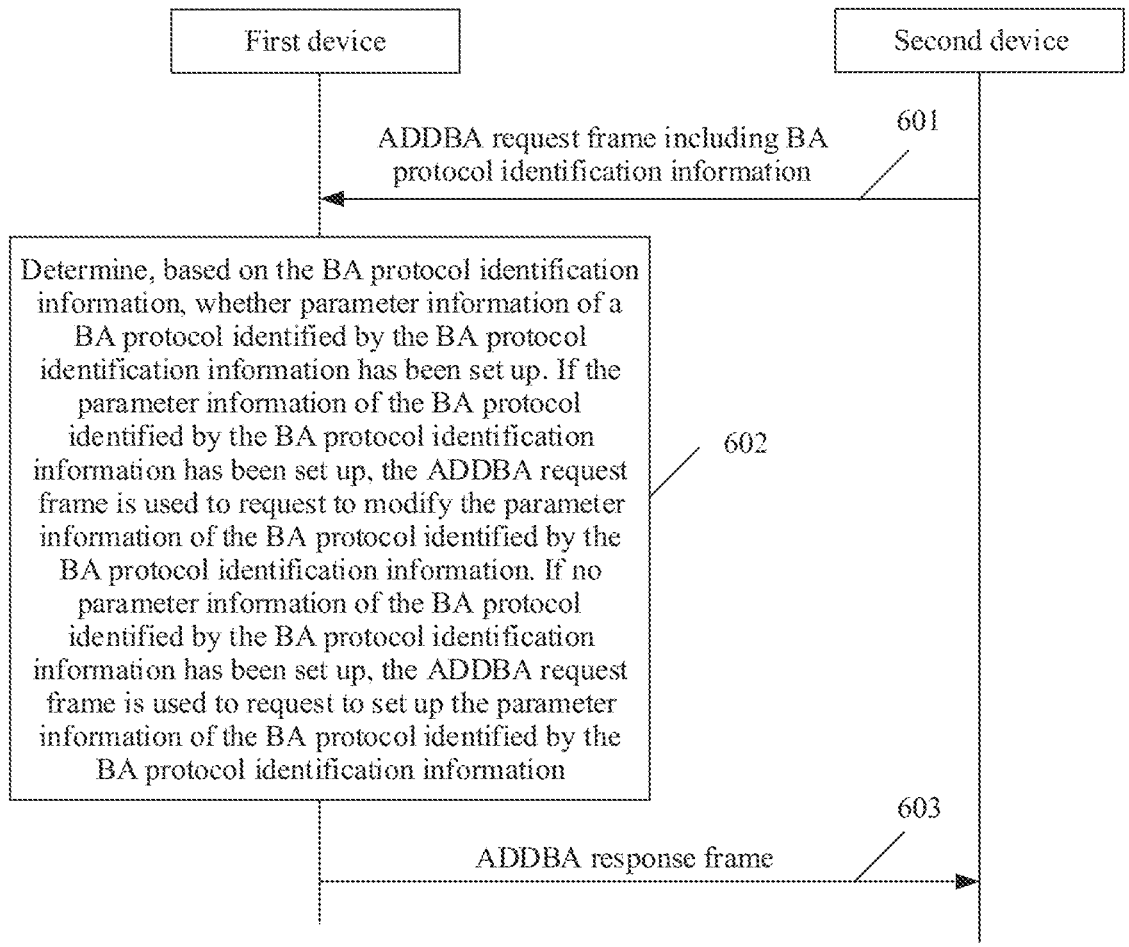
FIG. 5 is a schematic diagram of a structure of a block acknowledgment parameter set field according to an embodiment of this application.
FIG. 6 is a schematic flowchart of a method for modifying a BA protocol parameter according to an embodiment of this application.

In some embodiments of this application, FIG. 6 is a schematic flowchart of a method for modifying a BA protocol parameter according to an embodiment of this application. As shown in FIG. 6, the method includes the following steps.

601: A second device sends an ADDBA request frame including BA protocol identification information to a first device.

Correspondingly, the first device receives the ADDBA request frame including the BA protocol identification information.

602: The first device determines, based on the BA protocol identification information, whether parameter information of a BA protocol identified by the BA protocol identification information has been set up. If the parameter information of the BA protocol identified by the BA protocol identification information has been set up, the ADDBA request frame is used to request to modify the parameter information of the BA protocol identified by the BA protocol identification information. If no parameter information of the BA protocol identified by the BA protocol identification information has been set up, the ADDBA request frame is used to request to set up the parameter information of the BA protocol identified by the BA protocol identification information.

For example, a method for setting up parameter information of a BA protocol may be as follows: The first device sends the ADDBA request frame to the second device, where the ADDBA request frame may be used to request to set up the parameter information of the BA protocol identified by the BA protocol identification information. For example, the second device reserves a storage resource (or a buffer resource) based on a buffer size subfield in the ADDBA request frame, where the storage resource may be used to buffer or store multiple data frames. The second device sends an ADDBA response frame to the first device. The first device sets up, based on the ADDBA response frame, the parameter information of the BA protocol identified by the BA protocol identification information. For example, the first device reserves a storage resource (or a buffer resource) based on a buffer size subfield in the ADDBA response frame.

It may be understood that for related descriptions of the ADDBA request frame and the ADDBA response frame, refer to the foregoing embodiments. Details are not described herein again.

It may be understood that, when the ADDBA request frame is used to request to modify the parameter information of the BA protocol identified by the BA protocol identification information, for a specific modification operation of the first device, refer to the foregoing embodiments. Details are not described herein again.

603: The second device receives an ADDBA response frame from the first device.

Correspondingly, the first device sends the ADDBA response frame to the second device.

It may be understood that the ADDBA request frame may include link information, and the link information includes link information of one or more links. The link information is carried in multi-band fields in Table 1 and Table 2. Optionally, the one or more links may be link information of the BA protocol identified by the BA protocol identification information. Optionally, the one or more links may be links that need to be added to the link information of the BA protocol identified by the BA protocol identification information. It may be understood that, for related descriptions of the link information, refer to the method shown in FIG. 3. Details are not described herein again.

In this embodiment of this application, when receiving the ADDBA request frame, the first device may determine whether the BA protocol identified by the BA protocol identification information included in the ADDBA request frame has been set up. If no BA protocol has been set up, the first device sets up the parameter information of the BA protocol identified by the BA protocol identification information. If the BA protocol has been set up, the first device modifies, based on parameter information included in the ADDBA request frame, the parameter information of the BA protocol identified by the BA protocol identification information.

Figure 7:
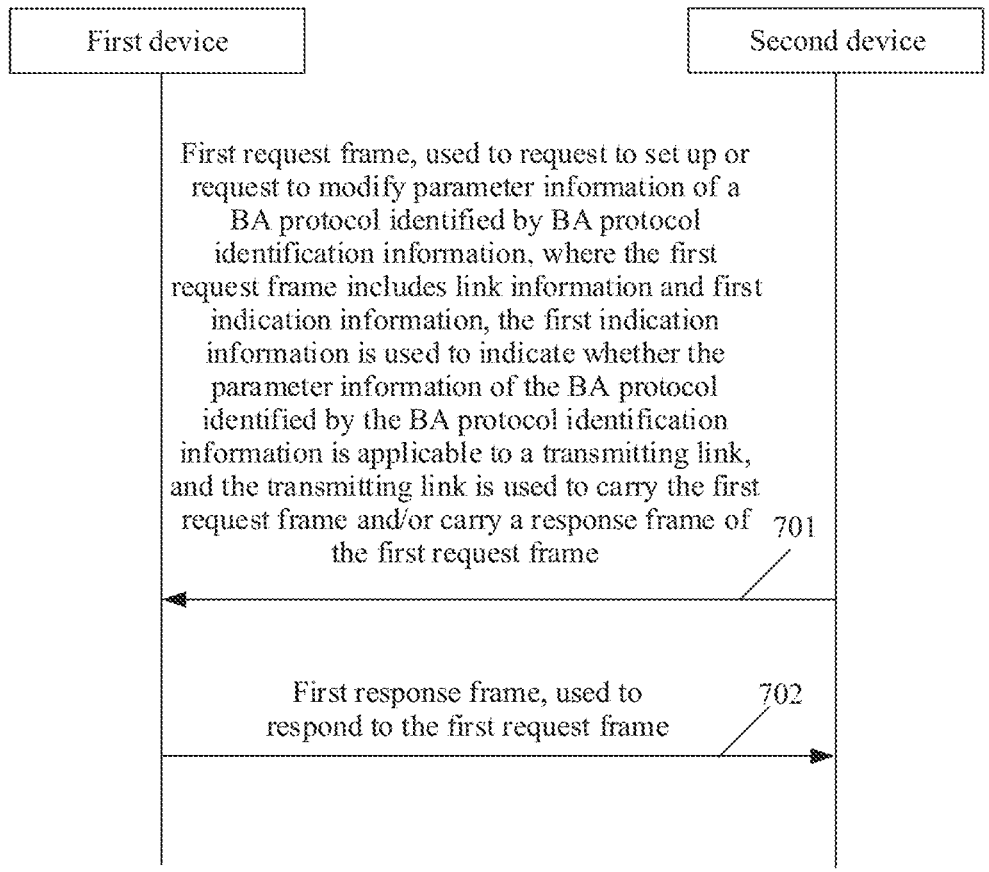
FIG. 7 is a schematic flowchart of a method for modifying a BA protocol parameter according to an embodiment of this application.

FIG. 7 is a schematic flowchart of a method for modifying a BA protocol parameter according to an embodiment of this application. As shown in FIG. 7, the method includes the following steps.

701: A second device sends a first request frame to a first device, where the first request frame is used to request to set up or request to modify parameter information of a BA protocol identified by BA protocol identification information. The first request frame further includes link information and first indication information. The first indication information is used to indicate whether the parameter information of the BA protocol identified by the BA protocol identification information is applicable to a transmitting link. The transmitting link is used to carry the first request frame and/or carry a response frame of the first request frame.

Correspondingly, the first device receives the first request frame.

In this embodiment of this application, the link information in the first request frame does not include link information of the transmitting link, and whether the parameter information of the BA protocol identified by the BA protocol identification information is applicable to the transmitting link is indicated by the first indication information.

A specific implementation of the first indication information in this embodiment of this application may be as follows:

Manner 1: The first indication information is a fragment number subfield whose value is a special value, and the fragment number subfield is located in a block acknowledgment starting sequence control (block ACK starting sequence control) field.

When the value of the fragment number field in the block acknowledgment starting sequence control field is the special value, the value may indicate whether the parameter information of the BA protocol identified by the BA protocol identification information included in the first request frame is applicable to the transmitting link.

Figure 8:
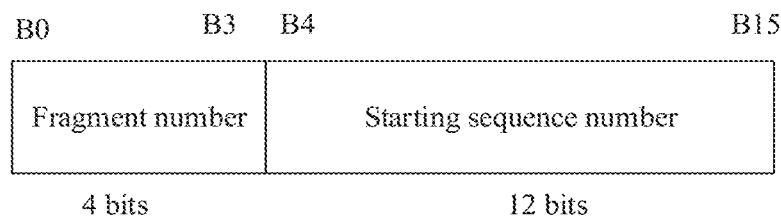
FIG. 8 is a schematic diagram of a structure of a block acknowledgment starting sequence control field according to an embodiment of this application.

FIG. 8 is a schematic diagram of a structure of a block acknowledgment starting sequence control field according to an embodiment of this application. As shown in FIG. 8, the block acknowledgment starting sequence control field may include a starting sequence number subfield and a fragment number subfield. A value of the fragment number subfield may be a special value, and the special value may be any one of 1 to 15. For example, the value of the fragment number subfield is 15, which may be used to indicate that the parameter information of the BA protocol identified by the BA protocol identification information included in the first request frame is applicable to the transmitting link. The value of the fragment number subfield is any one of 1 to 14, which may be used to that the parameter information of the BA protocol identified by the BA protocol identification information included in the first request frame is not applicable to the transmitting link. In another example, the value of the fragment number subfield is 1, which may be used to indicate that the parameter information of the BA protocol identified by the BA protocol identification information included in the first request frame, is applicable to the transmitting link. The value of the fragment number subfield is any one of 2 to 15, which may be used to that the parameter information of the BA protocol identified by the BA protocol identification information included in the first request frame is not applicable to the transmitting link, or the like. A specific value of the special value is not limited in this embodiment of this application.

Optionally, the first request frame may be an ADDBA request frame, the first request frame is a modification request frame, or the first request frame is a multi-TID BA setup request frame, or the like. A first response frame may be an ADDBA response frame, the first response frame is a change BA response frame, or the first response frame is a multi-TID BA setup response frame. In other words, the method shown in FIG. 7 may be combined with the methods shown in FIG. 3 to FIG. 6, and the method shown in FIG. 7 may alternatively be combined with the method shown in FIG. 9.

For example, the modification request frame includes link information of one or more links, and a value of the fragment number subfield of the block acknowledgment starting sequence control field in the modification request frame is 15 (for example only). In this case, the parameter information of the BA protocol identified by the BA protocol identification information included in the first request flame is not applicable to the transmitting link. Optionally, the multi-TID BA setup request frame and the multi-TID BA setup response frame max also include the first indication information.

Manner 2: A value of a block acknowledgment action field is a first value. The first value is used to indicate whether the parameter information of the BA protocol identified by the BA protocol identification information included in the first request frame is applicable to the transmitting link. The first value is any one of 3 to 127, 131, and 135 to 255.

Optionally, the first request frame may be a modification request frame, a multi-TID BA setup request frame, or the like. The first response frame may be a modification response frame or a multi-TID BA setup response frame.

For example, if a value of the block acknowledgment action field in the first request frame is 3, it may indicate that the first request frame is the modification request frame, and the parameter information of the BA protocol identified by the BA protocol identification information included in the modification request frame is not applicable to the transmitting link. If a value of the block acknowledgment action field in the first request frame is 4, it may indicate that the first request frame is the modification request frame, and the parameter information of the BA protocol identified by the BA protocol identification information included in the modification request frame is applicable to the transmitting link. Correspondingly, if a value of the block acknowledgment action field in the first response frame is 5, it indicates that the first response frame is a change BA response frame, and the parameter information of the BA protocol identified by the BA protocol identification information included in the change BA response frame is not applicable to the transmitting link. If a value of the block acknowledgment action field in the first response frame is 6, it indicates that the first response frame is the modification response frame, and the parameter information of the BA protocol identified by the BA protocol identification information included in the modification response frame is applicable to the transmitting link. Similarly, the method is also applicable to a case in which the first request frame is the multi-TID BA setup request frame and the first response frame is the multi-TID BA setup response frame.

702: The second device receives a first response frame from the first device, where the first response frame is used to respond to the first request frame.

Correspondingly, the first device sends the first response frame to the second device.

In this embodiment of this application, the first response frame may also include the first indication information. For a specific implementation of the first indication information, refer to the foregoing embodiments.

Optionally, an embodiment of this application further provides a BA protocol timeout rule. For example, after parameter information of a multi-link BA protocol is set up, if no data frame, block acknowledgment request (BAR)

frame, and block acknowledgment (BA) frame are transmitted on multiple links within a time threshold, the multi-link BA protocol times out. The method shown in FIG. 7 may further include the following steps.

After the parameter information of the BA protocol identified by the BA protocol identification information is set up, the parameter information of the BA protocol identified by the BA protocol identification information includes link information of one or more links. If no data frame, BAR frame, and BA frame are transmitted on the one or more links within the time threshold, the second device sends a deletion frame to the first device, where the deletion frame is used to request to delete the parameter information of the BA protocol identified by the BA protocol identification information. The first device receives the deletion frame. The first device deletes, based on the deletion frame, the parameter information of the BA protocol identified by the BA protocol identification information. The second device deletes the parameter information of the BA protocol identified by the BA protocol identification information.

For example, the deletion frame may be a DELBA frame or a multi-link deletion (multi-link DELBA) frame. The data frame may be understood as a data frame including a TID corresponding to the BA protocol identified by the BA protocol identification information.

In this embodiment of this application, the link information in the first request frame does not include link information of the transmitting link, and whether the parameter information of the BA protocol identified by the BA protocol identification is applicable to the transmitting link is indicated by the first indication information. Overheads of the link information are greater than overheads of the first indication information. According to the method in this embodiment of this application, overheads occupied by the first request frame can be reduced.

When the first device communicates with the second device, usually more than one type of service flows are transmitted, and multiple types of service flows may need to be transmitted. Therefore, in a process of setting up a BA protocol between the first device and the second device, multiple BA protocols may be set up through one frame interaction. Therefore, an embodiment of this application further provides a method for setting up multiple BA protocol parameters.

Figure 9:
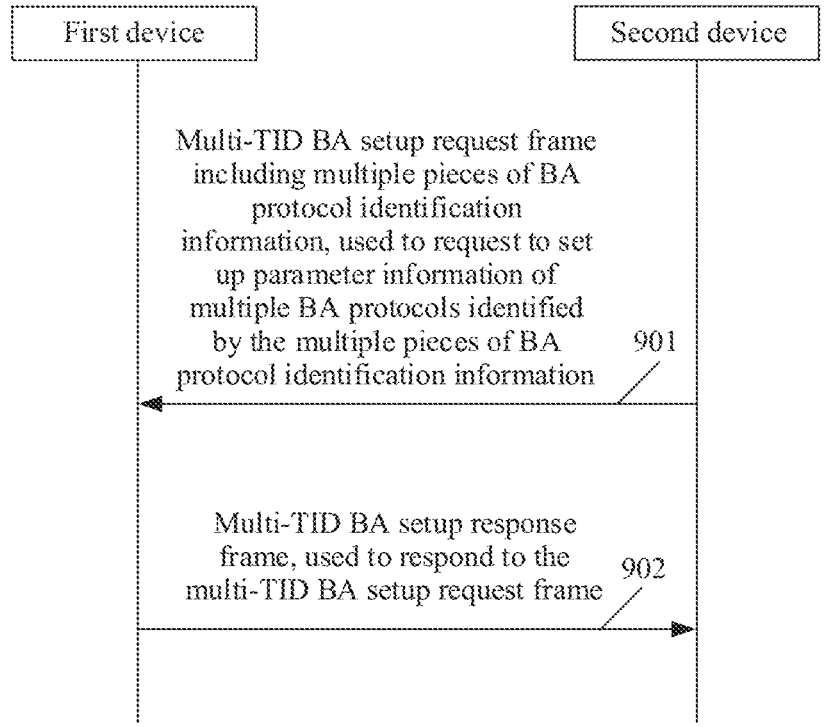
FIG. 9 is a schematic flowchart of a method for modifying a BA protocol parameter according to an embodiment of this application.

FIG. 9 is a schematic flowchart of a method for modifying a BA protocol parameter according to an embodiment of this application. The method may be applied to the devices shown in FIG. 1 and FIG. 2. As shown in FIG. 9, the method includes the following steps.

901: A second device sends a multi-traffic identifier (multi-traffic ID, multi-TID) BA setup request frame including multiple pieces of BA protocol identification information to a first device, where the multi-TID BA setup request frame is used to request to set up parameter information of multiple BA protocols identified by the multiple pieces of BA protocol identification information.

Correspondingly, the first device receives the multi-traffic identifier (multi-traffic ID, multi-TID) BA setup request frame including the multiple pieces of BA protocol identification information.

In this embodiment of this application, the multi-TID BA setup request frame includes multiple pieces of request information, and each of the multiple pieces of request information corresponds to one BA protocol. Each piece of request information includes one or more of the following information: a block acknowledgment parameter set (block ACK parameter set) field, a block acknowledgment timeout value (block ACK timeout value) field, and a block acknowledgment starting sequence control field. Optionally, each piece of request information may further include a number of links field, and the number of links field is used to indicate a number of links for multi-link aggregation communication.

For specific descriptions of the foregoing information, refer to the foregoing embodiments. Details are not described herein. It may be understood that information included in each piece of request information shown above is parameter information of a corresponding BA protocol. For example, the multi-TID BA setup request frame is used to request to set up parameter information of three BA protocols, such as parameter information of a BA protocol 1, parameter information of a BA protocol 2, and parameter information of a BA protocol 3. In this case, a first piece of request information includes information such as a block acknowledgment parameter set field of the BA protocol 1, a block acknowledgment timeout value field of the BA protocol 1, a number of links field of the BA protocol 1, and a block acknowledgment starting sequence control field of the BA protocol 1. A second piece of request information includes information such as a block acknowledgment parameter set field of the BA protocol 2, a block acknowledgment timeout value field of the BA protocol 2, a number of links field of the BA protocol 2, and a block acknowledgment starting sequence control field of the BA protocol 2. A third piece of request information includes information such as a block acknowledgment parameter set field of the BA protocol 3, a block acknowledgment timeout value field of the BA protocol 3, a number of links field of the BA protocol 3, and a block acknowledgment starting sequence control field of the BA protocol 3.

Optionally, the multi-TID BA setup request frame may alternatively include one piece of request information, and the request information includes one or more of the following information: a block acknowledgment parameter set field, a block acknowledgment timeout value field, and a block acknowledgment starting sequence control field. Optionally, each piece of request information may further include a number of links field.

Optionally, the multi-TID BA setup request frame may further include a number of TIDs field, and the number of TIDs field is used to indicate a number of BA protocols that need to be set up. When the multi-TID BA setup request frame includes one piece of request information, the multi-TID BA setup request frame may further include a TID indication. The TID indication is an "all TID" indication, and may be used to indicate that the foregoing parameter information is applicable to all BA protocols. For example, the first device may use the same parameter information to set up multiple BA protocols.

Optionally, the multi-TID BA setup request frame may further include link information of one or more links of each BA protocol. Alternatively, the multi-TID BA setup request frame may further include link information of one or more links corresponding to the multiple BA protocols, and link information of the multiple BA protocols is the same.

It may be understood that, when the multi-TID BA setup request frame includes link information of one link, it indicates that the multiple BA protocols requested by using the multi-TID BA setup request frame to be set up all correspond to one link. If the multi-TID BA setup request frame does not include link information of a link, it indicates that a link corresponding to the multiple BA protocols set up by using the multi-TID BA setup request frame is a transmitting link. The transmitting link is used to carry the multi-TID BA setup request frame and/or a multi-TID BA setup response frame.

902: The second device receives a multi-TID BA setup response frame from the first device, where the multi-TID BA setup response frame is used to respond to the multi-TID BA setup request frame.

Correspondingly, the first device sends the multi-TID BA setup response frame.

In this embodiment of this application, the multi-TID BA setup response frame includes multiple pieces of second indication information. Each of the multiple pieces of second indication information is used to indicate whether a corresponding BA protocol is successfully set up, and each of the multiple pieces of second indication information corresponds to one BA protocol. Alternatively, the multi-TID BA setup response frame includes one piece of second indication information, and the second indication information is used to indicate that the multiple BA protocols are successfully set up.

The multi-TID BA setup request frame may be an action frame, and a frame structure of a frame body part of the multi-TID BA setup request frame may be shown in Table 4.

TABLE 4

| Order | Information |
|---|---|
| 1 | Category |
| 2 | Block acknowledgment action (block ACK action) |
| 3 | Dialog token |
| 4 | Number of TIDs |
| 5 | Block acknowledgment parameter set (block ACK parameter set) |
| 6 | Block acknowledgment timeout value (block ACK timeout value) |
| 7 | Block acknowledgment starting sequence control (block ACK starting sequence control) |
| ... | |
| 3N − 1 | Block acknowledgment parameter set (block ACK parameter set) |
| 3N | Block acknowledgment timeout value (block ACK timeout value) |
| 3N + 1 | Block acknowledgment starting sequence control (block ACK starting sequence control) |
| 3N + 2 | Groupcast with retries group address element (GCR group address element) (optional) |
| 3N + 3 | Multi-band ((optional, one or more)) |
| 3N + 4 | TCLAS (optional) |
| 3N + 5 | ADDBA extension (optional) |

In this embodiment of this application, the multiple pieces of request information included in the multi-TID BA setup request frame may each be represented by a block acknowledgment parameter set field, a block acknowledgment timeout value field, and a block acknowledgment starting sequence control field. For example, a block acknowledgment parameter set field in an order of 5 may be used to represent a parameter related to a first BA protocol, and a block acknowledgment parameter set field in an order of 3N−1 may be used to represent a parameter related to a last BA protocol. Specifically, a number of TIDs included in the multi-TID BA setup request frame may indicate a number of BA protocols that are set up.

The multi-TID BA setup response frame is an action frame, and a frame structure of a frame body part of the multi-TID BA setup response frame may be shown in Table 5.

TABLE 5

| Order | Information |
|---|---|
| 1 | Category |
| 2 | Block acknowledgment action (block ACK action) |
| 3 | Dialog token |
| 4 | Number of TIDs |
| 5 | Status code |
| 6 | Block acknowledgment parameter set (block ACK parameter set) |
| 7 | Block acknowledgment timeout value (block ACK timeout value) |
| 8 | Block acknowledgment starting sequence control (block ACK starting sequence control) |
| ... | |
| 4N + 1 | Status code |
| 4N + 2 | Block acknowledgment parameter set (block ACK parameter set) |
| 4N + 3 | Block acknowledgment timeout value (block ACK timeout value) |
| 4N + 4 | Block acknowledgment starting sequence control (block ACK starling sequence control) |
| 4N + 5 | Groupcast with retries group address element (GCR group address element) (optional) |
| 4N + 6 | Multi-band ((optional, one or more)) |
| 4N + 7 | TOLAS (optional) |
| 4N + 8 | ADDBA extension (optional) |
| 4N + 9 | Originator preferred MCS (optional) |

For a number of times that a status code field, a block acknowledgment parameter set field, a block acknowledgment timeout value field, and a block acknowledgment starting sequence control field appear, refer to the descriptions of the multi-TID BA setup request frame. Details are not described herein again. The status code field may be used to indicate whether parameter information of a corresponding BA protocol is successfully set up. Optionally, Table 5 may include a "status code", used to indicate that parameter information of all BA protocols has been successfully set up.

Optionally, the method shown in FIG. 9 may further include:

The first device sets up parameter information of the multiple BA protocols identified by the multiple pieces of BA protocol identification information, and the second device sets up, based on the multi-TID BA setup response frame, parameter information of the multiple BA protocols identified by the multiple pieces of BA protocol identification information.

It may be understood that, for a specific implementation in which the first device and the second device set up the parameter information of the multiple BA protocols, refer to the method shown in the foregoing embodiments. Details are not described herein one by one.

Optionally, the method shown in FIG. 9 may further include:

The second device sends a deletion frame including the BA protocol identification information to the first device, where the deletion frame is used to indicate to delete the parameter information of the BA protocol identified by the BA protocol identification information. The first device deletes, based on the deletion frame, the parameter information of the BA protocol identified by the BA protocol identification information. The second device deletes the parameter information of the BA protocol identified by the BA protocol identification information.

For example, the deletion frame may be a multi-TID deletion (multi-TID DELBA) frame, and the multi-TID deletion frame may be used to indicate to delete parameter information of one or more BA protocols. For example, a frame structure of a frame body part of the multi-TID deletion frame may be shown in Table 6.

TABLE 6

| Order | Information |
|---|---|
| 1 | Category |
| 2 | Block acknowledgment action (block ACK action) |
| 3 | Dialog token |
| 4 | Number of TIDs |
| 5 | Delete BA protocol parameter set (DELBA parameter set) |
| ... | |
| N | Delete BA protocol parameter set (DELBA parameter set) |
| N + 1 | Reason code |
| N + 2 | Groupcast with retries group address element (GCR group address element) (optional) |
| N + 3 | Multi-band ((optional)) |
| N + 4 | TCLAS (optional) |

A number of TIDs field may be used to indicate a number of BA protocols that need to be deleted and that are identified by the BA protocol identification information. A number of repetition times of a delete BA protocol parameter set field may be correspondingly determined based on a number indicated in the number of TIDs field.

In this embodiment of this application, the first device may set up, by exchanging the multi-TID BA setup request frame and the multi-TID BA setup response frame, parameter information of the multiple BA protocols identified by the multiple pieces of BA protocol identification information of the first device. Similarly, the second device may set up, by exchanging the multi-TID BA setup request frame and the multi-TID BA setup response frame, parameter information of multiple BA protocols identified by the multiple pieces of BA protocol identification information of the second device.

It may be understood that the foregoing embodiments have respective focuses. For an implementation that is not described in detail in one of the embodiments, refer to other embodiments. Details are not described herein again. Further, the embodiments described in this specification may be independent solutions, or may be combined according to internal logic. All these solutions fall within the protection scope of this application.

The foregoing describes in detail the methods provided in the embodiments of this application. The following describes in detail the communication apparatuses provided in the embodiments of this application.

Figure 10:
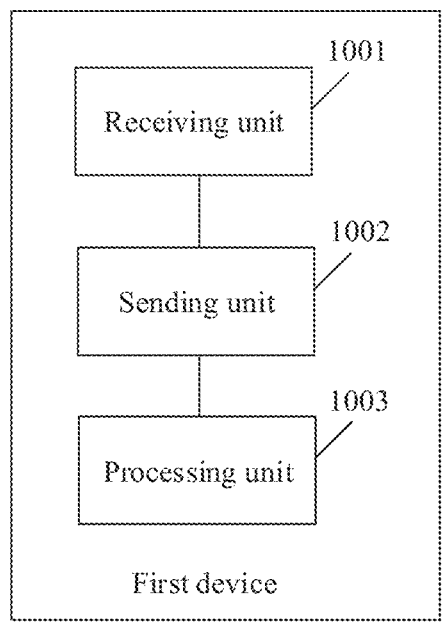
FIG. 10 is a schematic diagram of a structure of a first device according to an embodiment of this application.

FIG. 10 is a schematic diagram of a structure of a first device according to an embodiment of this application.

As shown in FIG. 10, in an embodiment, the first device includes:

a receiving unit 1001, configured to receive a modification request frame including BA protocol identification information from a second device, where the modification request frame is used to request to modify parameter information of a BA protocol identified by the BA protocol identification information; and a sending unit 1002, configured to send a modification response frame to the second device, where the modification response frame is used to respond to the modification request frame.

In a possible implementation, the first device further includes:

a processing unit 1003, configured to modify the parameter information of the BA protocol identified by the BA protocol identification information.

In a possible implementation, the modification request flame includes block acknowledgment action (block ACK action) information, and a value of the block acknowledgment action field in the modification request frame is 3.

In a possible implementation, the modification response frame includes a block acknowledgment action field, and a value of the block acknowledgment action field in the modification response frame is 4.

In a possible implementation, the modification request frame includes link information, and the link information includes link information of one or more links.

In a possible implementation, the link information includes an operating class, a channel number, and a band identifier (band ID).

In a possible implementation, the modification request frame further includes first indication information. The first indication information is used to indicate whether the parameter information of the BA protocol identified by the BA protocol identification information is applicable to a transmitting link. The transmitting link is used to carry the modification request frame and/or the modification response frame.

In a possible implementation, the first indication information is a fragment number subfield whose value is a special value, and the fragment number subfield is located in a block acknowledgment starting sequence control (block ACK starting sequence control) field.

In another embodiment, the first device includes:

a receiving unit 1001, which may be configured to receive a multi-traffic identifier (multi-traffic ID, multi-TID) BA setup request frame including multiple pieces of BA protocol identification information from a second device, where the multi-TID BA setup request frame is used to request to set up parameter information of multiple BA protocols identified by the multiple pieces of BA protocol identification information; and a sending unit 1002, which may be configured to send a multi-TID BA setup response frame to the second device, where the multi-TID BA setup response frame is used to respond to the multi-TID BA setup request frame.

In a possible implementation, a processing unit 1003 may be configured to set up the parameter information of the multiple BA protocols identified by the multiple pieces of BA protocol identification information.

In a possible implementation, the multi-TID BA setup request frame includes multiple pieces of request information, and each of the multiple pieces of request information corresponds to one BA protocol. Each piece of request information includes one or more of the following information: a block acknowledgment parameter set (block ACK parameter set) field, a block acknowledgment timeout value (block ACK timeout value) field, and a block acknowledgment starting sequence control field.

In a possible implementation, the multi-TID BA setup request frame includes link information, the link information includes link information of one or more links, and link information of the multiple BA protocols identified by the multiple pieces of BA protocol identification information is the same.

In a possible implementation, the multi-TID BA setup request frame further includes first indication information. The first indication information is used to indicate whether the parameter information of the multiple BA protocols identified by the multiple pieces of BA protocol identification information is applicable to a transmitting link. The transmitting link is used to carry the multi-TID BA setup request frame and/or carry the multi-TID BA setup response frame.

In a possible implementation, the first indication information is a fragment number subfield whose value is a special value, and the fragment number subfield is located in the block acknowledgment starting sequence control (block ACK starting sequence control) field.

In a possible implementation, the receiving unit 1001 may be further configured to receive a multi-TID deletion frame including the BA protocol identification information from the second device, where the multi-TID deletion frame is used to request to delete the parameter information of the BA protocol identified by the BA protocol identification information.

The processing unit 1003 may be further configured to delete, based on the multi-TID deletion frame, the parameter information of the BA protocol identified by the BA protocol identification information.

In another embodiment, the first device includes:

a receiving unit 1001, which may be configured to receive a first request frame from a second device, where the first request frame is used to request to set up or request to modify parameter information of a BA protocol identified by BA protocol identification information, the first request frame further includes link information and first indication information, the first indication information is used to indicate whether the parameter information of the BA protocol identified by the BA protocol identification information is applicable to a transmitting link, and the transmitting link is used to carry the first request frame and/or carry a response frame of the first request frame; and a sending unit 1002, which may be configured to send a first response frame to the second device, where the first response frame is used to respond to the first request frame.

In a possible implementation, the first indication information is a fragment number subfield whose value is a special value, and the fragment number subfield is located in a block acknowledgment starting sequence control (block ACK starting sequence control) field.

In a possible implementation, the link information includes an operating class, a channel number, and a band identifier (band ID).

In the foregoing embodiments:

In a possible implementation, the processing unit 1003 may be implemented by one or more processors, the sending unit 1002 may be implemented by a transmitter, and the receiving unit 1001 may be implemented by a receiver, or the sending unit 1002 and the receiving unit 1001 may be integrated into one device, for example, implemented by a transceiver.

In a possible implementation, the processing unit 1003 may be implemented by one or more processing circuits, the sending unit 1002 may be implemented by an output circuit, and the receiving unit 1001 may be implemented by an input circuit, or the sending unit 1002 and the receiving unit 1001 may be integrated into one device, for example, implemented by an interface circuit.

It may be understood that for implementation of the units shown in FIG. 10, refer to corresponding descriptions of the method embodiments shown in FIG. 3 to FIG. 9.

Figure 11:
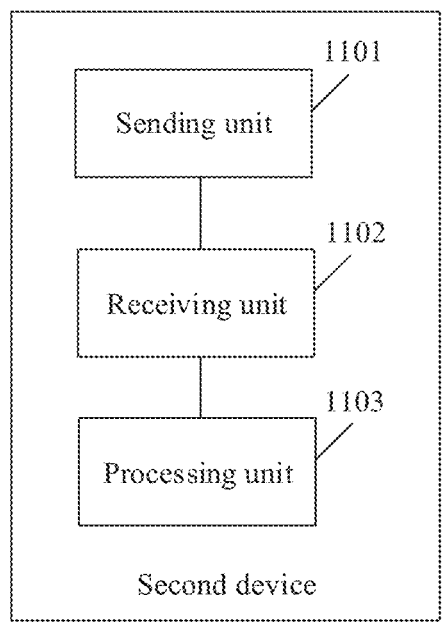
FIG. 11 is a schematic diagram of a structure of a second device according to an embodiment of this application.

FIG. 11 is a schematic diagram of a structure of a second device according to an embodiment of this application. As shown in FIG. 11, the second device includes:

a sending unit 1101, configured to send a modification request frame including BA protocol identification information to a first device, where the modification request frame is used to request to modify parameter information of a BA protocol identified by the BA protocol identification information; and a receiving unit 1102, configured to receive a modification response frame from the first device, where the modification response frame is used to respond to the modification request frame.

In a possible implementation, the apparatus further includes:

a processing unit 1103, configured to modify, based on the modification response frame, the parameter information of the BA protocol identified by the BA protocol identification information.

In a possible implementation, the modification request frame includes block acknowledgment action (block ACK action) information, and a value of the block acknowledgment action field in the modification request frame is 3.

In a possible implementation, the modification response frame includes a block acknowledgment action field, and a value of the block acknowledgment action field in the modification response frame is 4.

In a possible implementation, the modification request frame includes link information, and the link information includes link information of one or more links.

In a possible implementation, the link information includes an operating class, a channel number, and a band identifier (band ID).

In a possible implementation, the modification request frame further includes first indication information. The first indication information is used to indicate whether the parameter information of the BA protocol identified by the BA protocol identification information is applicable to a transmitting link. The transmitting link is used to carry the modification request frame and/or carry the modification response frame.

In a possible implementation, the first indication information is a fragment number field whose value is a special value. The fragment number field is a fragment number field whose value is the special value in a block acknowledgment starting sequence control (block ACK starting sequence control) field.

In another embodiment, the second device includes:

a sending unit 1101, which may be configured to send a multi-traffic identifier (multi-traffic ID, multi-TID) BA setup request frame including multiple pieces of BA protocol identification information to a first device, where the multi-TID BA setup request frame is used to request to set up parameter information of multiple BA protocols identified by the multiple pieces of BA protocol identification information; and a receiving unit 1102, which may be configured to receive a multi-TID BA setup response frame from the first device, where the multi-TID BA setup response frame is used to respond to the multi-TID BA setup request frame.

In a possible implementation, a processing unit 1103 may be configured to set up, based on the multi-TID BA setup response frame, the parameter information of the multiple BA protocols identified by the multiple pieces of BA protocol identification information.

In a possible implementation, the multi-TID BA setup request frame includes multiple pieces of request information, and each of the multiple pieces of request information corresponds to one BA protocol. Each piece of request information includes one or more of the following information: a block acknowledgment parameter set (block ACK parameter set) field, a block acknowledgment timeout value (block ACK timeout value) field, and a block acknowledgment starting sequence control field.

In a possible implementation, the multi-TID BA setup request frame includes link information of one or more links, and link information of the multiple BA protocols identified by the multiple pieces of BA protocol identification information is the same.

In a possible implementation, the multi-TID BA setup request frame further includes first indication information. The first indication information is used to indicate whether the parameter information of the multiple BA protocols identified by the multiple pieces of BA protocol identification information is applicable to a transmitting link. The transmitting link is used to carry the multi-TID BA setup request frame and/or carry the multi-TID BA setup response frame.

In a possible implementation, the first indication information is a fragment number subfield whose value is a special value, and the fragment number subfield is located in the block acknowledgment starting sequence control (block ACK starting sequence control) field.

In a possible implementation, the sending unit 1101 may be further configured to send a multi-TID deletion frame including the BA protocol identification information to the first device, where the multi-TID deletion frame is used to request to delete the parameter information of the BA protocol identified by the BA protocol identification information. The processing unit 1103 may be further configured to delete the parameter information of the BA protocol identified by the BA protocol identification information.

In another embodiment, the second device includes:

a sending unit 1101, which may be configured to send a first request frame to a first device, where the first request frame is used to request to set up or request to modify parameter information of a BA protocol identified by BA protocol identification information, the first request frame includes link information and first indication information, the first indication information is used to indicate whether the parameter information of the BA protocol identified by the BA protocol identification information is applicable to a transmitting link, and the transmitting link is used to carry the first request frame and/or carry a response frame of the first request frame; and a receiving unit 1102, which may be configured to receive a first response frame from the first device, where the first response frame is used to respond to the first request frame.

In a possible implementation, the first indication information is a fragment number subfield whose value is a special value, and the fragment number subfield is located in a block acknowledgment starting sequence control (block ACK starting sequence control) field.

In a possible implementation, the link information includes an operating class, a channel number, and a band identifier (band ID).

In the foregoing embodiments:

In a possible implementation, the processing unit 1103 may be implemented by one or more processors, the sending unit 1101 may be implemented by a transmitter, and the receiving unit 1102 may be implemented by a receiver, or the sending unit 1101 and the receiving unit 1102 are integrated into one device, for example, implemented by a transceiver.

In a possible implementation, when the second device is a chip, the processing unit 1103 may be implemented by one or more processing circuits, the sending unit 1101 may be implemented by an output circuit, and the receiving unit 1102 may be implemented by an input circuit, or the sending unit 1101 and the receiving unit 1102 are integrated into one device, for example, implemented by an interface circuit.

It may be understood that for implementation of the units shown in FIG. 11, refer to corresponding descriptions of the method embodiments shown in FIG. 3 to FIG. 9.

Figure 12:
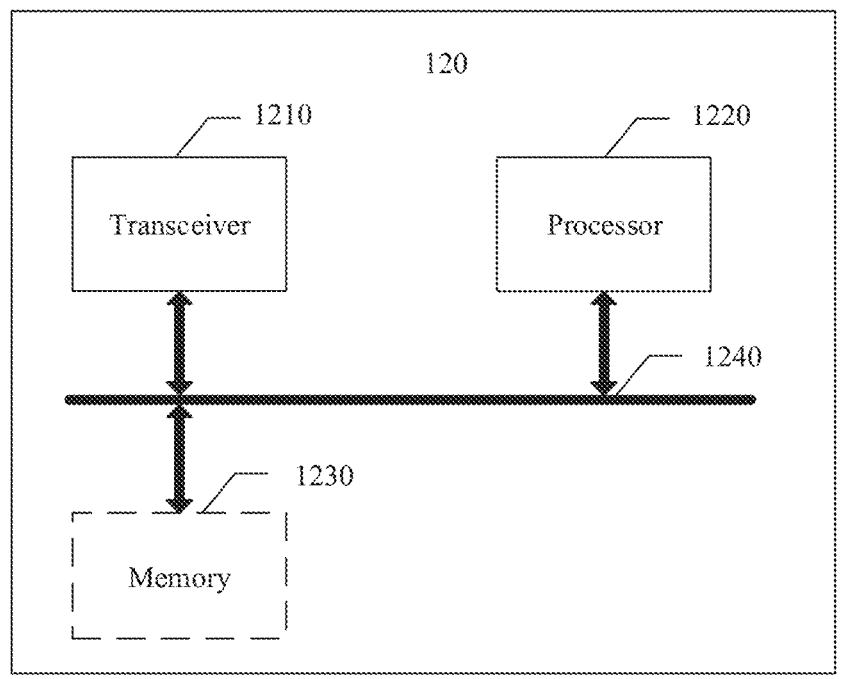
FIG. 12 is a schematic diagram of a structure of a communication device according to an embodiment of this application.

For example, when the processing unit in the foregoing device is implemented by a processor, and the receiving unit and the sending unit are integrated into one and implemented by a transceiver, as shown in FIG. 12, a device 120 includes at least one processor 1220, configured to implement functions of the first device or the second device in the method provided in the embodiments of this application. The device 120 may further include a transceiver 1210. The transceiver may be configured to communicate with another device by using a transmission medium. The processor 1220 transmits and receives data by using the transceiver 1210 (for example, transmits and receives a modification request frame and a modification response frame), and is configured to implement the method described in the foregoing method embodiments.

Optionally, the device 120 may further include at least one memory 1230, configured to store program instructions and/or data. The memory 1230 is coupled to the processor 1220. Coupling in the embodiments of this application is an indirect coupling or a communication connection between apparatuses, units, or modules, may be in an electrical, a mechanical, or another form, and is used for information exchange between the apparatuses, the units, or the modules. The processor 1220 may operate with the memory 1230. The processor 1220 may execute the program instructions stored in the memory 1230.

In this embodiment of this application, a specific connection medium among the transceiver 1210, the processor 1220, and the memory 1230 is not limited. In this embodiment of this application, the memory 1230, the processor 1220, and the transceiver 1210 are connected by using a bus 1240 in FIG. 12. The bus is represented by using a thick line in FIG. 12. A manner of connection between other components is merely an example for description, and is not limited thereto. The bus may be classified into an address bus, a data bus, a control bus, and the like. For ease of representation, only one thick line is used to represent the bus in FIG. 12, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

The memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through examples but not imitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

According to the methods provided in the embodiments of this application, this application further provides a computer program product. The computer program product includes computer program code. When the computer program code is run on a computer, the computer is enabled to perform the method in the embodiments shown in FIG. 3 to FIG. 9.

According to the methods provided in the embodiments of this application, this application further provides a computer-readable medium. The computer-readable medium stores program code. When the program code is run on a computer, the computer is enabled to perform the method in the embodiments shown in FIG. 3 to FIG. 9.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a BA protocol indication method. The forgoing modification request frame or setup request frame includes indication information, and the indication information is used to indicate whether a BA block acknowledgment frame only acknowledges a data frame on only one link of a transmit end device, or may acknowledge data frames on multiple links of the transmit end device.

Generally, when the transmit end sends a data frame on one link, a receive end replies with a BA block acknowledgment frame on the same link, where the BA block acknowledgment frame includes acknowledgment information of the data frame. However, there is also a possibility that when the receive end replies with the BA block acknowledgment frame, the BA block acknowledgment frame not only includes the acknowledgment information of the data frame received on this link, but also includes acknowledgment information of a data frame received on another link.

In a possible implementation, the indication information is located in a block ack parameter set field in the modification request frame or the setup request frame. For example, the indication information is located in a specific bit in B2 to B4 in the block ack parameter set field in the modification request frame or the setup request frame. Two values of the bit each indicate that the BA block acknowledgment frame acknowledges a data frame on only one link of the transmit end device, and acknowledges data frames on multiple links of the transmit end device.

When receiving the modification request frame or the setup request frame, the receive end device performs corresponding processing.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using the figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, various illustrative logical blocks and steps that are described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method for each particular application to implement the described functions, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for modifying a block acknowledgment (block ACK, BA) protocol parameter, comprising:
   receiving, by a first device, a multi-traffic identifier (multi-TID) BA setup request frame comprising multiple pieces of BA protocol identification information from a second device, wherein the multi-TID BA setup request frame is used to request to set up parameter information of multiple BA protocols identified by the multiple pieces of BA protocol identification information; and
   sending, by the first device, a multi-TID BA setup response frame to the second device, wherein the multi-TID BA setup response frame is used to respond to the multi-TID BA setup request frame.

2. The method according to claim 1, wherein the method further comprises:
   setting up, by the first device, the parameter information of the multiple BA protocols identified by the multiple pieces of BA protocol identification information.

3. The method according to claim 1, wherein the multi-TID BA setup request frame comprises multiple pieces of request information, and each of the multiple pieces of request information corresponds to one BA protocol; and
   each piece of request information comprises one or more of a block ACK parameter set field, a block ACK timeout value field, and a block ACK starting sequence control field.

4. The method according to claim 1, wherein the multi-TID BA setup request frame comprises link information, the link information comprises link information of one or more links, and link information of the multiple BA protocols identified by the multiple pieces of BA protocol identification information is the same.

5. The method according to claim 1, wherein the multi-TID BA setup request frame further comprises first indication information, the first indication information is used to indicate whether the parameter information of the multiple BA protocols identified by the multiple pieces of BA protocol identification information is applicable to a transmitting link, and the transmitting link is used to carry at least one of the multi-TID BA setup request frame or the multi-TID BA setup response frame.

6. The method according to claim 5, wherein the first indication information is a fragment number subfield with a special value, and the fragment number subfield is located in a block ACK starting sequence control field.

7. The method according to claim 1, wherein the method further comprises:
   receiving, by the first device, a multi-TID deletion frame comprising a BA protocol identification information from the second device, wherein the multi-TID deletion frame is used to request to delete the parameter information of the BA protocol identified by the BA protocol identification information; and
   deleting, by the first device based on the multi-TID deletion frame, the parameter information of the BA protocol identified by the BA protocol identification information.

8. A method for modifying a block acknowledgment (block ACK, BA) protocol parameter, comprising:
   sending, by a second device, a multi-traffic identifier (multi-TID) BA setup request frame comprising multiple pieces of BA protocol identification information to a first device, wherein the multi-TID BA setup request frame is used to request to set up parameter information of multiple BA protocols identified by the multiple pieces of BA protocol identification information; and
   receiving, by the second device, a multi-TID BA setup response frame from the first device, wherein the multi-TID BA setup response frame is used to respond to the multi-TID BA setup request frame.

9. The method according to claim 8, wherein the method further comprises:
   setting up, by the second device based on the multi-TID BA setup response frame, the parameter information of the multiple BA protocols identified by the multiple pieces of BA protocol identification information.

10. The method according to claim 8, wherein the multi-TID BA setup request frame comprises multiple pieces of request information, and each of the multiple pieces of request information corresponds to one BA protocol; and
    each piece of request information comprises one or more of a block ACK parameter set field, a block ACK timeout value field, and a block ACK starting sequence control field.

11. The method according to claim 8, wherein the multi-TID BA setup request frame comprises link information, the link information comprises link information of one or more links, and link information of the multiple BA protocols identified by the multiple pieces of BA protocol identification information is the same.

12. The method according to claim 8, wherein the multi-TID BA setup request frame further comprises first indication information, the first indication information is used to indicate whether the parameter information of the multiple BA protocols identified by the multiple pieces of BA protocol identification information is applicable to a transmitting link, and the transmitting link is used to carry at least one of the multi-TID BA setup request frame or the multi-TID BA setup response frame.

13. The method according to claim 12, wherein the first indication information is a fragment number subfield with a special value, and the fragment number subfield is located in a block ACK starting sequence control field.

14. The method according to claim 8, wherein the method further comprises:
    sending, by the second device, a multi-TID deletion frame comprising a BA protocol identification information to the first device, wherein the multi-TID deletion frame is used to request to delete the parameter information of the BA protocol identified by the BA protocol identification information; and
    deleting, by the second device, the parameter information of the BA protocol identified by the BA protocol identification information.

15. A first device, comprising a transceiver and at least one processor; and
    one or more memories including computer-executable instructions that, when executed by the at least one processor, cause the first device to:
      receive a multi-traffic identifier (multi-TID) block acknowledgment (block ACK, BA) setup request frame comprising multiple pieces of BA protocol identification information from a second device, wherein the multi-TID BA setup request frame is used to request to set up parameter information of multiple BA protocols identified by the multiple pieces of BA protocol identification information; and
      send a multi-TID BA setup response frame to the second device, wherein the multi-TID BA setup response frame is used to respond to the multi-TID BA setup request frame.

16. The first device according to claim 15, wherein the computer-executable instructions, when executed by the at least one processor, further cause the first device to:
set up the parameter information of the multiple BA protocols identified by the multiple pieces of BA protocol identification information.

17. The first device according to claim 15, wherein the multi-TID BA setup request frame comprises multiple pieces of request information, and each of the multiple pieces of request information corresponds to one BA protocol; and
each piece of request information comprises one or more of a block ACK parameter set field, a block ACK timeout value field, and a block ACK starting sequence control field.

18. The first device according to claim 15, wherein the multi-TID BA setup request frame comprises link information, the link information comprises link information of one or more links, and link information of the multiple BA protocols identified by the multiple pieces of BA protocol identification information is the same.

19. The first device according to claim 15, wherein the multi-TID BA setup request frame further comprises first indication information, the first indication information is used to indicate whether the parameter information of the multiple BA protocols identified by the multiple pieces of BA protocol identification information is applicable to a transmitting link, and the transmitting link is used to carry at least one of the multi-TID BA setup request frame or the multi-TID BA setup response frame.

20. The first device according to claim 19, wherein the first indication information is a fragment number subfield with a special value, and the fragment number subfield is located in a block ACK starting sequence control field.

* * * * *